United States Patent
Klebe (10) Patent No.: US 8,752,758 B1
(45) Date of Patent: Jun. 17, 2014

(54) USE OF SCANNABLE 2-D BAR CODES TO PROVIDE CONTEXT-SENSITIVE INFORMATION FOR A WEIGHING DEVICE

(71) Applicant: Mettler-Toledo, LLC, Columbus, OH (US)

(72) Inventor: Felix Klebe, Worthington, OH (US)

(73) Assignee: Mettler-Toledo, LLC, Columbus, OH (US)

(*) Notice: Subject to any disclaimer, the term of this patent is extended or adjusted under 35 U.S.C. 154(b) by 0 days.

(21) Appl. No.: 13/841,973

(22) Filed: Mar. 15, 2013

(51) Int. Cl.
*G06F 17/00* (2006.01)
*G06K 15/00* (2006.01)
*G06K 7/10* (2006.01)

(52) U.S. Cl.
USPC .. 235/375; 235/383; 235/462.01; 235/462.09

(58) Field of Classification Search
CPC . G06Q 30/0237; G06F 1/00; G06F 17/30861; G06F 17/30876; G06F 17/30879; H04W 4/00; G06K 7/10881
USPC ............... 235/375, 383, 385, 462.01, 462.09, 235/462.15
See application file for complete search history.

(56) References Cited

U.S. PATENT DOCUMENTS

| | | | |
|---|---|---|---|
| 5,578,797 A * | 11/1996 | Hewitt et al. | 177/5 |
| 7,752,085 B2 | 7/2010 | Monroe | |
| 8,278,570 B2 * | 10/2012 | Sun | 177/25.13 |
| 2001/0034671 A1 * | 10/2001 | Luke et al. | 705/28 |
| 2002/0077857 A1 | 6/2002 | Seelinger | |
| 2004/0222026 A1 * | 11/2004 | Kohn et al. | 177/25.13 |
| 2010/0163613 A1 * | 7/2010 | Bucher et al. | 235/375 |
| 2011/0147449 A1 * | 6/2011 | Lu | 235/375 |
| 2011/0214143 A1 | 9/2011 | Rits et al. | |
| 2012/0022947 A1 * | 1/2012 | Esprey | 705/14.64 |
| 2012/0067945 A1 * | 3/2012 | Zsigmond et al. | 235/375 |
| 2013/0098990 A1 * | 4/2013 | Cameron et al. | 235/375 |

FOREIGN PATENT DOCUMENTS

| | | |
|---|---|---|
| CN | 101729982 A | 6/2010 |
| EP | 1517256 A2 | 3/2005 |
| FR | 2968423 A1 | 6/2012 |
| WO | 2012/135867 A1 | 10/2012 |

* cited by examiner

*Primary Examiner* — Tuyen K Vo
(74) *Attorney, Agent, or Firm* — Standley Law Group LLP (57) ABSTRACT

Systems and methods of using 2-D barcodes to provide information responsive to a particular error condition/event of, or need for operational or configuration assistance with respect to, a weighing device that is adapted to generate and display such 2-D barcode. The 2-D barcode contains a hyperlink to a context-sensitive web page that contains information relevant to the 2-D barcode. An image of the 2-D barcode is captured with a scanning device and the 2-D barcode is decoded by an appropriate scanning application of the scanning device. The scanning device is subsequently caused to request the web page as directed by the hyperlink in the 2-D barcode. The web page request is received at a server or similar location, and the requested web page is sent to the scanning device for viewing and use by a user.

20 Claims, 7 Drawing Sheets

USE OF SCANNABLE 2-D BAR CODES TO PROVIDE CONTEXT-SENSITIVE INFORMATION FOR A WEIGHING DEVICE

TECHNICAL FIELD

Embodiments of the invention are directed to systems and methods of using scannable two-dimensional (2D) bar codes to provide information responsive to a particular error condition or question relating to the operation, configuration or some other function of a weighing device.

BACKGROUND

Embodiments of the invention are generally associated with advanced weighing devices, which typically means a weighing device that includes a microprocessor and associated programming. Embodiments of such an advanced weighing device (which may also be referred to herein as a "weighing device" for brevity) may also include an operating system and possibly other associated software. Examples of such advanced weighing devices include, without limitation, industrial scales, PC-based retail scales, and checkweighers. While an industrial scale and a PC-based retail scale are generally understood to be static weighing devices, a checkweigher would be understood by one of skill in the art as a device that weighs moving objects, usually objects traveling along a conveyor. Advanced weighing devices may be utilized in a variety of industries such as, for example and without limitation, retail stores, restaurants, manufacturing facilities, and laboratories.

When in the form of a scale, such an advanced weighing device may include a body portion (e.g., frame), and an object receiving platform (e.g., weigh pan) that rests upon one or more subjacent load cells. Memory, one or more displays, and an input means may also be included. Such scales may also include wired or wireless networking ability and/or a label printer. The display screen(s) of such a scale may be a touch screen, and may be integrated into or otherwise attached to the body portion of the scale or located remotely therefrom. In certain embodiments, the display portion of such a scale may be associated with a terminal that may also contain control electronics and other components of the weighing device. Other embodiments of advanced weighing devices are also possible.

As advanced weighing devices include microprocessors, such weighing devices can be programmed to report error messages, abnormal conditions, etc. Currently, when an advanced weighing device displays an error code or message, a user is required to undertake considerable effort in order to understand the meaning of the error code and to then determine what should be done in response. For example, a typical user response to the display of such an error code would be to first look up the meaning of the error code in a technical manual. Subsequently thereto, the user would look for technical support information (e.g., bulletins, troubleshooting guides, etc.) for instruction on how to correct the error or the process settings that may have caused the error.

This is less than desirable for a number of reasons. For one, various technical manuals must generally be kept on hand and referenced each time an error code is investigated. Updates to error codes or recommended actions in response to error codes would then require that the technical manuals be correspondingly updated. Looking up each error code and then researching possible error solutions is also time consuming and inefficient—especially considering that the advanced weighing device of interest may be non-functional and one or more processes that make use of the advanced weighing device may have to be stopped until the error is corrected.

In addition to the reporting of error messages, abnormal conditions, etc., users of advanced weighing devices may also need general information regarding the operation and/or configuration of the weighing device. As with error codes, a user may also need to undertake considerable effort to locate operational and/or configuration information relating to a given weighing device. For example, a user would typically need to look up such information in a technical manual, search for the information online, and/or call a technical support telephone number and communicate with a support representative.

Also as in the case of investigating error codes, locating support information in such a manner is undesirable for a number of reasons. For one, various technical manuals must again generally be kept on hand and referenced each time an operation or configuration issue is investigated. Updates to operation methods, sequences, etc., and/or changes in configuration techniques would then require that the associated technical manuals be correspondingly updated. Looking up operational or configuration information in this manner is also time consuming and inefficient.

For at least these reasons, it should be understood that it would be desirable to provide an improved system and method of responding to weighing device error codes and the need for weighing device operation and/or configuration information. Embodiments of the invention allow for such a response.

SUMMARY

Embodiments of the invention may be functional to provide weighing terminal end users, service technicians, remote support personnel, etc., with a means to quickly access context-sensitive information relating to a given weighing device error code that is generated in response to some event/condition of the weighing device. Such information may include, for example, the status diagnostics of the weighing device, tips for use and/or troubleshooting, and other supporting product information.

Embodiments of the invention may also function as a means to provide weighing terminal end users, service technicians, remote support personnel, etc., with convenient access to context sensitive information regarding the general operation and configuration of a given weighing device. Examples of such information might include product training resources, configuration guides, message boards, instructional videos, and other product information sources.

Embodiments of the invention make use of two-dimensional (2-D) barcodes (also referred to as matrix codes). Two commonly used 2-D barcodes are Microsoft Tags (MS tags) and quick response (QR) codes. These 2-D barcodes are used by embodiments of the invention to improve the ability of a user to quickly and easily understand and respond to weighing device errors and/or to quickly locate information relating to the operation or configuration of a given weighing device.

2-D barcodes need not be described in detail herein, as such codes would be well known to those of skill in the art. Generally, however, 2-D barcodes such as QR codes and MS tags may be described as bar codes that contain a matrix of data. In comparison to the older 1-D (UPC) barcodes that consist of a plurality of parallel lines, data is presented in a 2-D barcode as a multitude of arranged shapes, often squares (dots) or triangles, including a plurality of normalizing shapes, located within a bounding grid. Whereas the older UPC barcodes are read using a light beam, 2-D barcodes are digitally imaged and analyzed by a processor to extract the encoded information. 2-D barcodes offer significant read time and data storage improvements over the older UPC bar codes.

According to one embodiment of the invention, a weighing device may be programmed to create and present a unique 2-D barcode based on a given event/condition of the weighing device. Additionally, embodiments of the invention may include a weighing device that is programmed to create and present 2-D barcodes that contain other (e.g., operational and/or configuration) information about the weighing device, with such information being presented without regard to any specific event or condition of the weighing device. For example, an operational and/or configuration related 2-D barcode may be presented in response to a particular user input, such as pressing a button provided on the weighing device.

In either case, a corresponding 2-D barcode may be presented on the weighing device display. The 2-D barcode may contain, among possible other things, information about the weighing device such as model number, serial number, configuration, firmware revision(s), calibration information, and in some circumstances, information that is relevant to a weighing device event/condition in existence at the time the 2-D barcode was generated.

The displayed 2-D barcode may be scanned via a camera-enabled scanning device, such as a mobile device in the form of a smart phone or tablet PC having Internet connectivity. Once scanned, the 2-D barcode is decoded and used to launch a browser or similar application that opens a web page containing or populated with information relevant to the 2-D barcode.

In another embodiment of the invention, a 2-D barcode may be scanned and decoded but rather than launching a web page containing or populated with information relevant to the 2-D barcode on the camera enabled scanning device, a command contained in the bar code may direct the server from which such a web page emanates to provide the web page information to another device. The other device may be a PC or other computing device that has a larger display, printer access, or may be located in a more comfortable environment that enables the web page to be more easily viewed or acted upon.

The 2-D barcode may contain data that identifies the weighing device (e.g., by model). The 2-D barcode may also contain information that identifies an event/condition that triggered the display of the 2-D barcode. Consequently, the user may be provided with as much information as possible in regard to the reason for generation of the 2-D barcode.

In addition to providing a user with information relevant to the weighing device and an event/condition identified by a 2-D barcode, embodiments of the invention may also log all or certain information relating to the weighing device from which the 2-D barcode emanated, an event/condition experienced by the weighing device, and various information about the user and/or the user's location.

In other embodiments of the invention where a camera-enabled, Internet-capable mobile device may not be available, the 2-D barcode may be downloaded to another camera-enabled device or a storage device such as a USB flash drive for subsequent downloading to another device having Internet connectivity. Alternatively, but less preferably, the 2-D barcode may be imaged and emailed or texted as an attachment for remote evaluation by a support technician.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
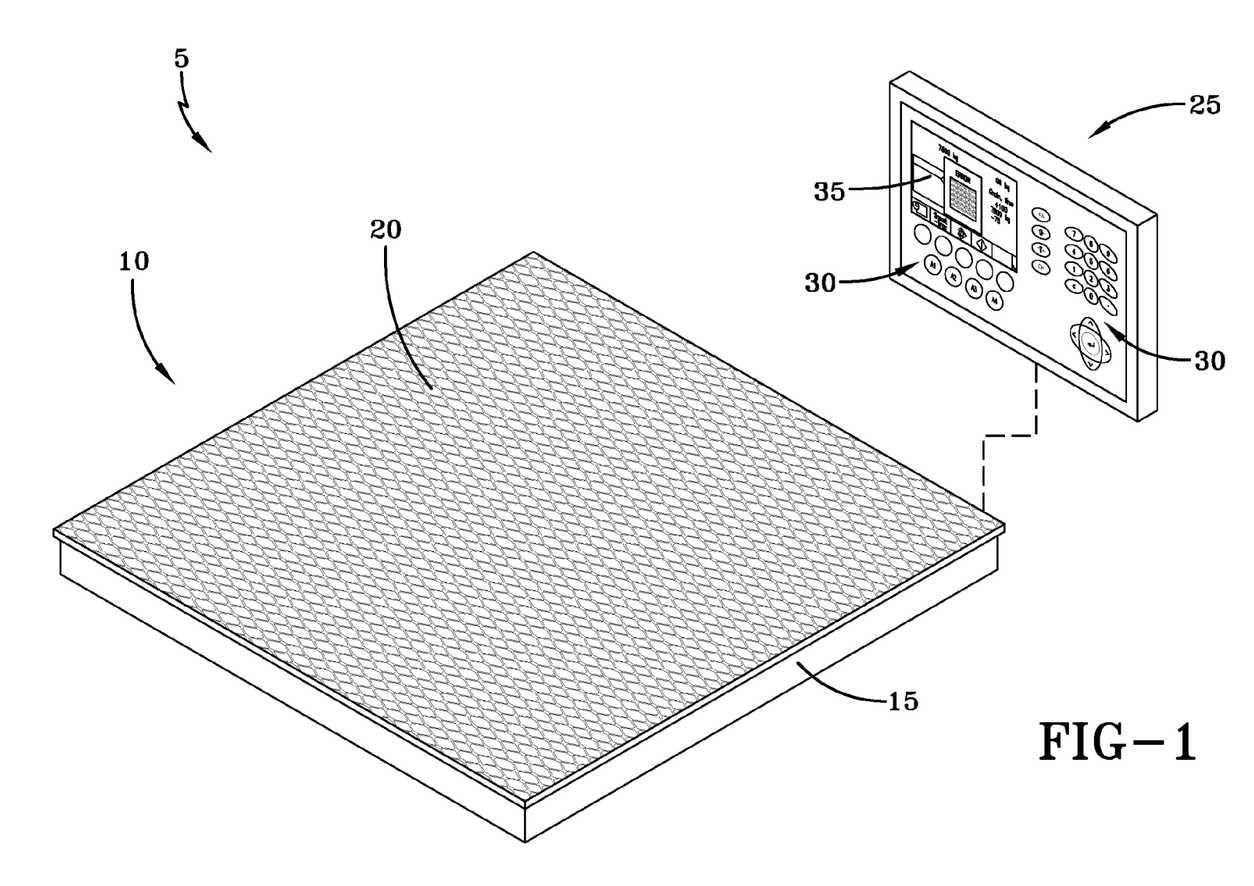
FIG. 1 is a perspective view of one exemplary weighing device that may form a part of the invention.

One version of a weighing device 5 that may form a part of an exemplary embodiment of the invention is depicted in FIG. 1. In this particular example, the weighing device 5 is implemented as an industrial floor scale for providing static weight readings of objects of interest. The weighing device is shown to include a weighing portion 10 that generally includes a frame 15 within the bounds of which reside one or more load cells (not shown) that support an object receiving platform 20. An object placed on the platform 20 will cause the load cell(s) to produce a signal that is indicative of the weight of the object—as would be well understood by one of skill in the art.

The weighing device 5 is also shown to include a weighing terminal 25 that may be attached to or located remotely from the weighing portion 10 of the weighing device. The weighing terminal 25 is placed in wired or wireless communication with the weighing portion 10 of the weighing device 5, as represented by the dashed connecting line in FIG. 1.

In this particular example, the weighing terminal 25 includes internal control electronics that govern operation of the weighing device 5, a human machine interface (HMI) portion 30 that allows a user to interact with the weighing device, and a display 35. The weighing terminal 25 also includes a microprocessor-based device that is appropriately programmed to produce and display 2-D barcodes as described in more detail below. The weighing terminal 25 may also have memory and may be adapted for, without limitation, wireless, Ethernet, and/or USB connection. Other weighing terminal features are also possible and nothing described or not described herein is to be construed as a limitation in that regard. Non-limiting and commercially available examples of such weighing terminals include the IND 780 and IND 890 weighing terminals available from Mettler-Toledo, LLC in Columbus, Ohio.

The weighing devices associated with other embodiments of the invention may be similar to or considerably different from the weighing device 5 shown in FIG. 1. For example, weighing devices used in other applications such as postal and laboratory applications may also be a part of the invention, as may be virtually any other weighing device that is capable of being programmed to produce and display 2-D barcodes as described in more detail below. It is also to be understood that while the exemplary embodiments shown and described herein refer to static weighing devices, the invention is also applicable to devices such as checkweighers that weigh objects while in motion.

As one skilled in the art will understand, several 2-D barcode standards exist. Consequently, it should also be realized that the use of various types of 2-D barcodes are possible according to the invention. That is, a 2-D barcode used in invention is not limited to the type shown in the drawing figures. Rather, a 2-D barcode used in the invention may be any type of 2-D barcode now known or yet to be developed.

While several types of 2-D barcodes may be used, the exemplary embodiments described herein below and illustrated in the accompanying drawing figures refer only to a 2-D barcode in the form of a QR code. This limitation is provided only for ease of illustration and description, and is not to be interpreted in any way as limiting the invention only to the use of QR codes.

Furthermore, while the exemplary embodiments described herein below and illustrated in the accompanying drawing figures refer only to the generation and use of a 2-D barcode with respect to a weighing device error condition or event for ease of illustration and description, the generation and use of a 2-D bar code according to the invention may be for other reasons such as in regard to the need for operational and/or configuration information as described above. Thus, the invention is not limited to the use of 2-D bar codes only for the purpose of providing error code or weighing device event information.

Figure 2:
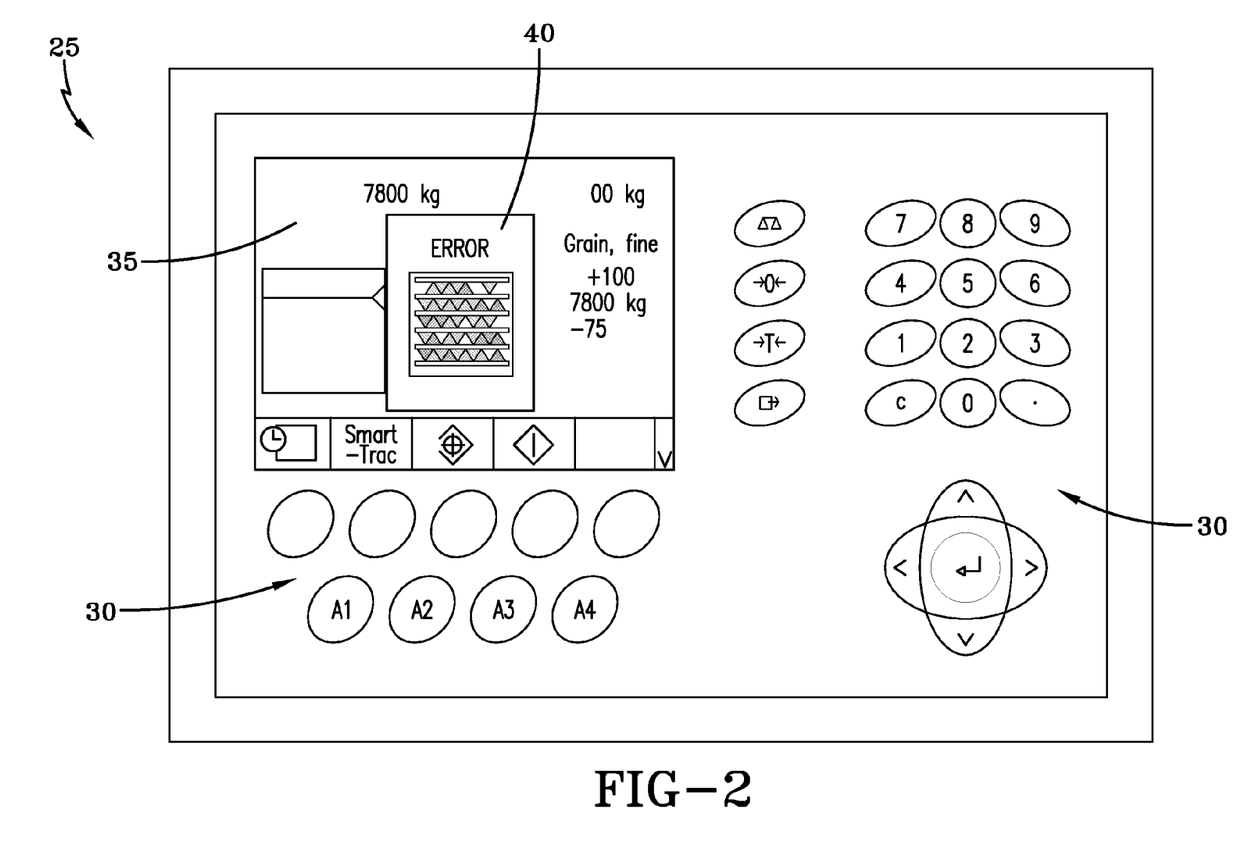
FIG. 2 depicts an exemplary display of the weighing device of FIG. 1 with a 2-D barcode in the form of a QR code presented thereon as a result of some weighing device event/condition.

The display 35 of the weighing terminal 25 shown in FIG. 1 may be more clearly observed in FIG. 2. As shown in FIG. 2, a QR code 40 is presented on the display 35 of the weighing terminal 25 as a result of some weighing device event/condition. As used herein, an event/condition generally refers to some type of erroneous operation, malfunction or other event that causes the weighing device to become inoperative or to at least require attention of some sort within some period of time. Therefore, when used to interpret event/conditions, the QR code may be thought of as an advanced error code.

The QR code 40 may be exaggerated in size and/or appearance in FIG. 2 for purposes of clarity. For example, while the QR code 40 is shown to occupy a significant portion of the display 35 and to overlie and hide certain other information that would otherwise be presented on the display, the QR code could be less obtrusive and/or relegated to a corner or other portion of the display where it is less likely to obstruct other information.

Figure 3A:
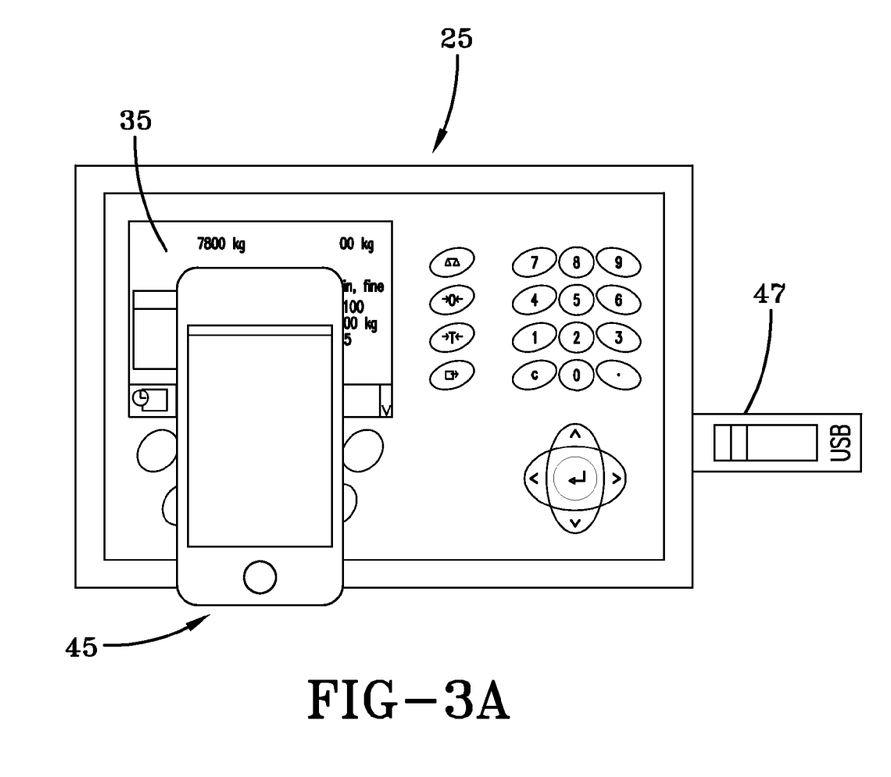
FIG. 3a represents a mobile device being used to scan the QR code of FIG. 2.
Figure 3B:
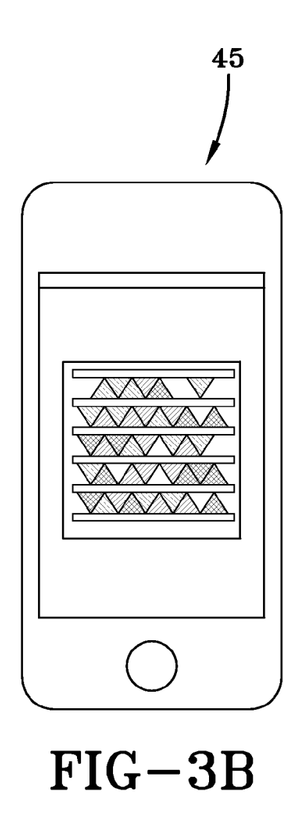
FIG. 3b is an enlarged view of the mobile device of FIG. 3a after scanning of the displayed QR code of FIG. 2.

The use of a mobile device 45 as a scanning device for scanning the QR code 40 shown in FIG. 2 is represented in FIGS. 3a-3b. In this example, the mobile device 45 is a camera-enabled smart phone loaded with an appropriate QR code scanning application. The camera of the smart phone is utilized to acquire a digital image of the QR code 40. Once the QR code image is acquired (as shown in FIG. 3b), the scanning application, simply put, allows the mobile device 45 to convert the QR code's arrangement of dots into binary numbers for decoding of the data embedded in the QR code. Such applications are well known and readily available and, therefore, need not be discussed in further detail herein.

As would also be well known to one of skill in the art, a QR code may contain various types of information. For example, and without limitation, a QR code may include data that when decoded, causes the scanning device (e.g., smart phone) to display text, graphics or contact information. Alternatively, or in addition to displaying other information, a QR code may include a hyperlink that causes the scanning device to open a specific web page. Still further, a QR code can include information that enables tracking of the location where the QR code is scanned—either by employing GPS technology or by including a location in the QR code (e.g., in a fixed location QR code).

While the scanning device is depicted in FIGS. 3a-3b to be a mobile device 45 in the form of a smart phone, it should be realized that other scanning devices may also be used. For example, the scanning device may be a camera-enabled tablet PC or another camera-enabled mobile device loaded with an appropriate QR code scanning application and having Internet connectivity. Alternatively, the scanning device may be a camera-enabled mobile device without internet connectivity but with the ability to transfer a captured QR code image to another device that is loaded with an appropriate QR code scanning application and has Internet connectivity. Such a scanning device may simply be a digital camera.

Figure 3C:
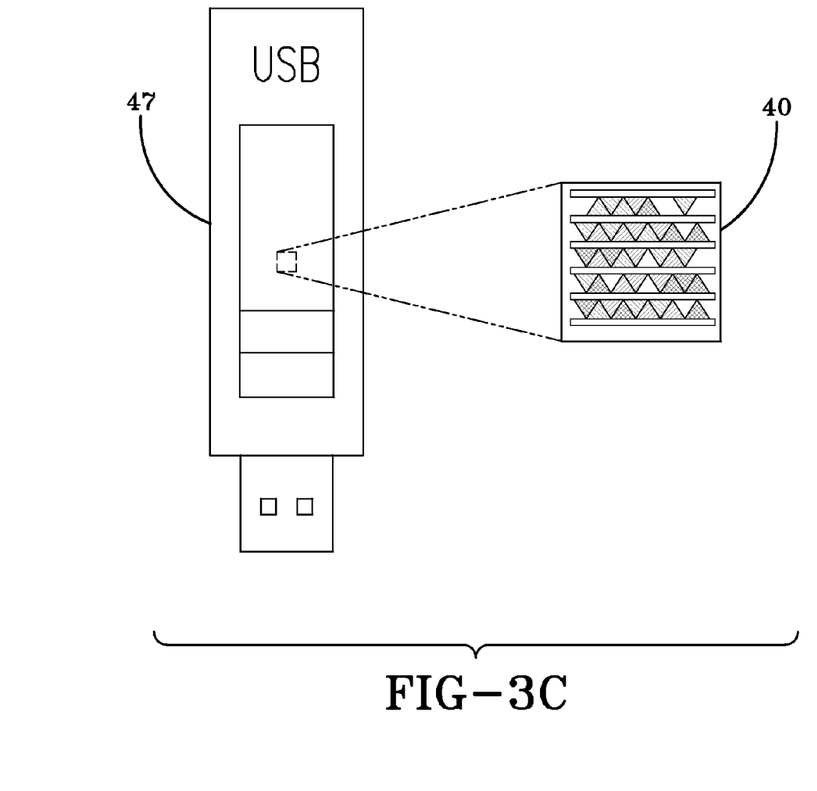
FIG. 3c depicts a USB flash drive initially shown in FIG. 3a, after the QR code of FIG. 2 has been downloaded thereto by the weighing device of FIG. 1.

Still alternatively, and as depicted in FIGS. 3b-3c, the weighing device itself may allow the QR code 40 to be saved to a USB flash drive 47 or another storage medium by which the QR code may be subsequently transferred to another device that is loaded with an appropriate QR code scanning application and has Internet connectivity. It should be understood that the QR code 40 in FIG. 3c is an imaginary illustration of digital data representing the QR code image which is stored within the USB flash drive 47. In the latter two alternative embodiments, the QR code scanning application resident on the device to which the QR code image is transferred decodes the QR code and acts accordingly.

A system for implementing the invention may be constructed in numerous ways. For example, in addition to a user interface (e.g., smart phone), such a system may include a web server, and a central data server that hosts or is otherwise in contact with one or more databases. When more than one database is present, each database may be type specific. Of course, a single database may be used and may, therefore, contain more than one type of data.

The one or more databases may reside on the central data server or on another individual data server in communication therewith. Alternatively, when more than one database is present, all of the databases, or a majority of the databases, may reside on multiple data servers that may be accessed by the central data server. When multiple data servers are involved, the data servers may reside at a single location, or may reside at several locations. In a similar manner, when multiple databases and/or data servers are employed, they may or may not be owned or controlled by a single entity.

Aside from one or more databases containing the QR code context-sensitive information, a system for implementing the invention may also include a data collection database. The data collection database, like the other databases, may reside on the central data server, or on another server in communication therewith. Such a data collection database may be used to store information such as the registered IP address of a user interface device accessing a given web page, device specific diagnostics information associated with a given QR code, and user information entered as the result of user interactions with a user interface. Such a data collection database may also be used to store other information of interest such as, without limitation, the date/time of QR code generation, the date/time of a web page request as a result of QR code decoding, the event/condition that generated the QR code, the model number of the weighing device, the serial number of the weighing device, the software version of the weighing device, and other various weighing device configuration information. The weighing device may be programmed to write such information into the QR codes.

Collecting and storing such information provides for various data-mining opportunities, such as determining the frequency of errors, the geographic use of support tools, etc. Other analysis of the collected data is obviously also possible.

Figure 4:
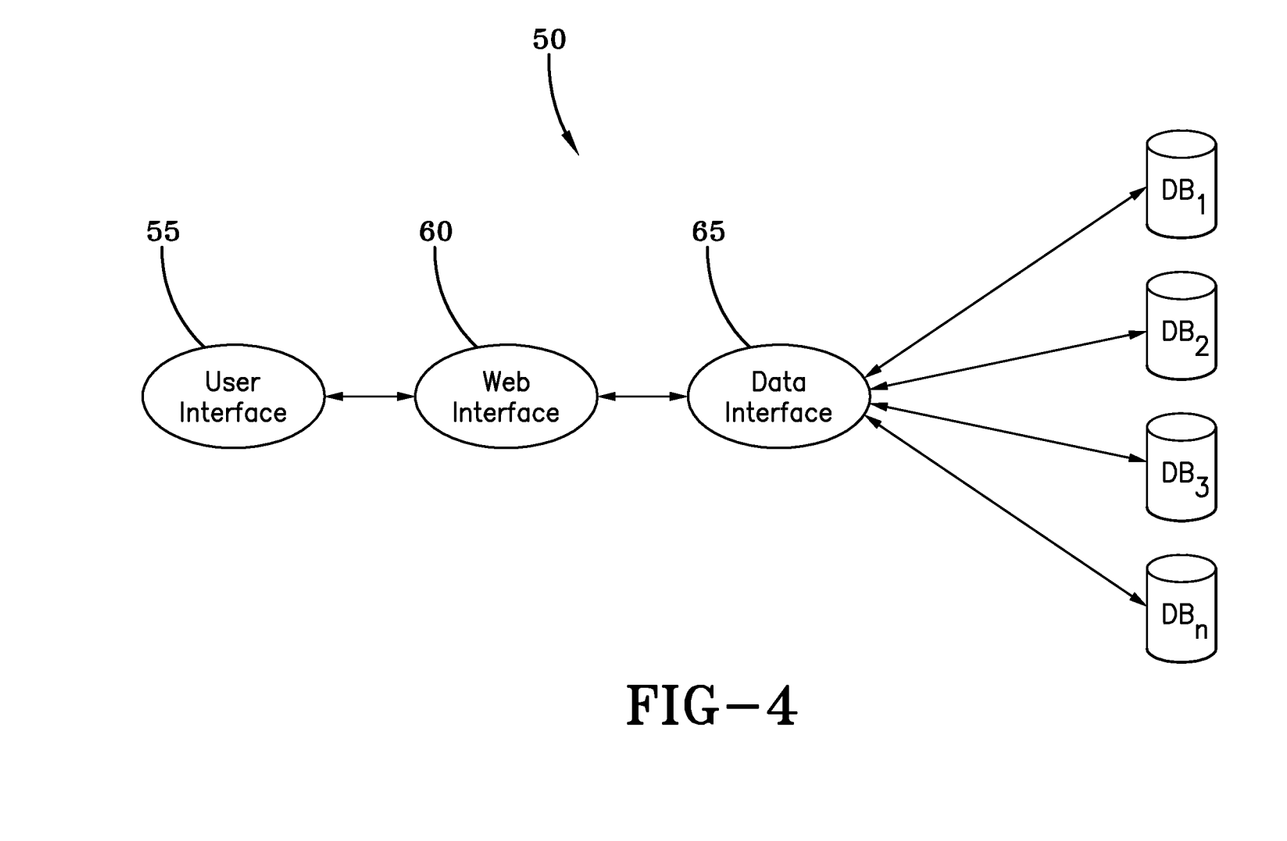
FIG. 4 is a block diagram view representing the interactions of one exemplary hardware implementation of a system of the invention.

The interactions between various components of one exemplary implementation of a system 50 for using scannable QR codes to provide context-sensitive information in response to a weighing device error condition is schematically depicted in FIG. 4. As can be observed, the system 50 includes a user interface 55 that communicates with a web interface 60, and a data interface 65 that communicates with the web interface and one or more databases $DB_1$-$DB_n$.

The user interface 55 may be the smart phone 45 shown in FIGS. 3a-3b, another mobile device such as a tablet PC, or some other device that is loaded with an appropriate QR code scanning application and has Internet connectivity, as explained above. The user interface 55 may allow a user to capture a digital image of a QR code, or the QR code digital image may be provided to the user interface as described above. In any event, the user interface 55 includes a QR code scanning application that is functional to decode the information contained in the QR code.

QR codes according to the invention include a hyperlink or some other mechanism of direction to a web page containing information that is relevant to the QR code. For example, the web page may be presented in response to a QR code from a particular weighing device or model of weighing device. The web page may also contain information, such as troubleshooting information, that is relevant to the underlying weighing device event/condition that produced the QR code. Alternatively, the web page may contain a link(s) to another web page(s) and/or may present a document or provide a link to a document(s) or other type of information that is relevant to the underlying weighing device event/condition that produced the QR code.

In an alternate embodiment, the hyperlink may result in the opening of a more generic web (landing) page having an integrated remote web application. The remote web application then uses data from the QR code to communicate with one or more of the databases $DB_1$-$DB_n$ and to extract the appropriate data therefrom to populate the generic landing page with data relevant to the QR code. This technique may reduce the number of individual context sensitive (QR code-responsive) web pages that need to be created.

To this end, the user interface 55 of this exemplary system 50 communicates with the web interface 60 upon decoding a QR code. The web interface 60 may be resident on a web server and is responsible for interactions between the user interface and the website that hosts the web page(s) presented on the user interface 55 upon decoding of a scanned QR code. For example, the web interface 60 is responsible for presenting the initial web page as determined by the scanned QR code and for presenting subsequent web pages of the website to the user, such as in response to user selections or data input. The web interface 60 may also be responsible for collecting QR code data and for optionally sending QR code data to one or more of the databases $DB_1$-$DB_n$, such as via the data interface 65.

The data interface 65 may be hosted on a data server. The data interface 65 essentially manages requests for data that are received from the web interface 60, such as may occur as a result of QR code decoding or as a result of subsequent selections or inputs on the user interface 55. The data interface 65 is responsible for tasks such as analyzing data requests, locating requested data, retrieving requested data from the appropriate database(s), and providing the data to the web interface 60. The data interface 65 may also be responsible for converting the format of the retrieved data if it is not compatible with the operating system or other software application(s) resident on the user interface 55.

While not specifically shown in FIG. 4, the system 50 may also include a data collection database as described above.

Figure 5A:
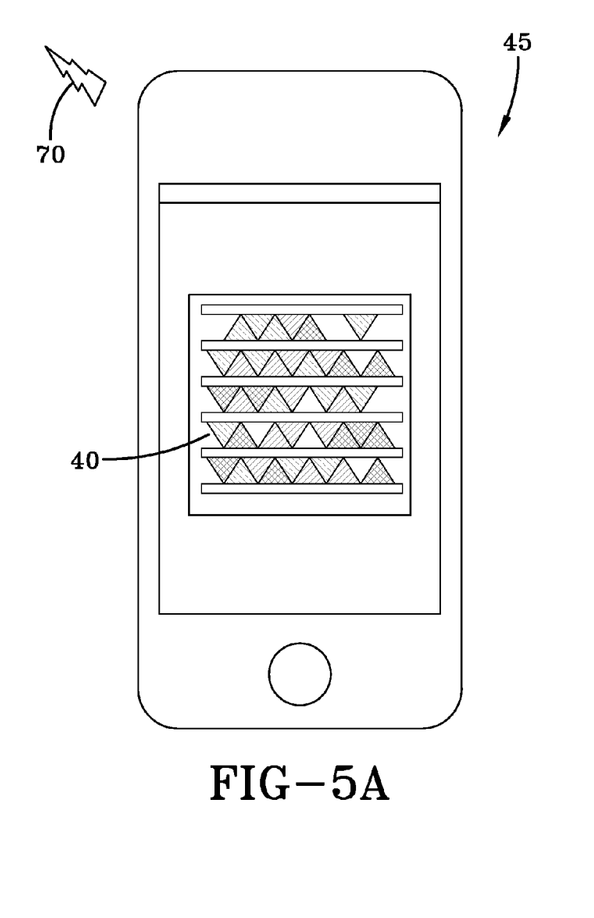
FIGS. 5a and 5b reflect screen views of the mobile device of FIGS. 3a-3b when used as the user interface of FIG. 4.
Figure 5B:
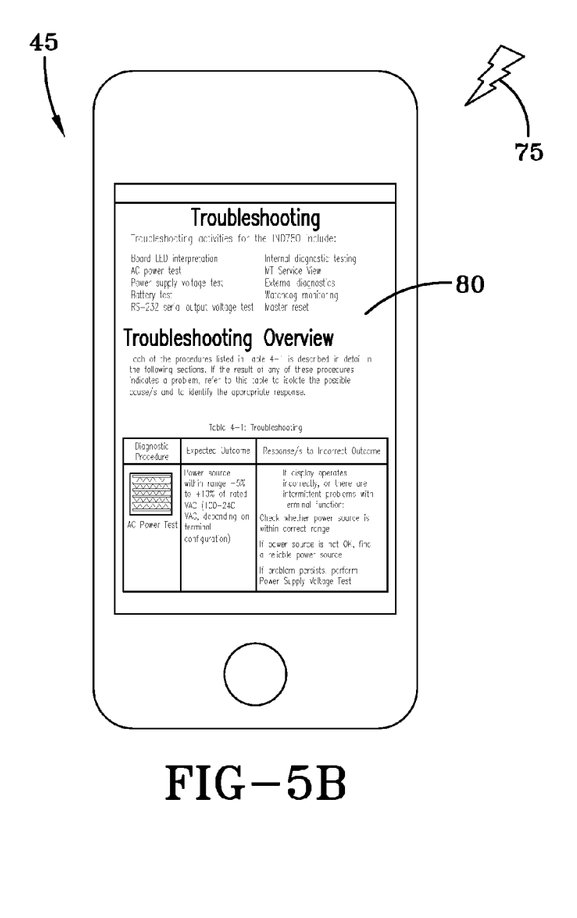

FIGS. 5a-5b graphically illustrate the use of the smart phone 45 of FIGS. 3a-3b to decode the QR code 40 and to receive, such as by using a system like that illustrated in FIG. 4, a web page containing context-sensitive information relevant to the QR code.

FIG. 5a depicts the smart phone 45 after acquiring a digital image of the QR code 40. As indicated by the outgoing data transmission arrow 70, the QR code scanning application resident on the smart phone 45 decodes the QR code 40 and, as a result, a web browser or similar application of the smart phone requests a specific web page via a wireless connection to the Internet. The web page being requested is determined by the associated data embedded in the QR code 40, as explained above.

Referring now to FIG. 5b, the requested web page 80 has been sent (as represented by the incoming data transmission arrow 75) to the smart phone 45 and presented on the display screen thereof. In this example, the web page 80 includes weighing device model identifying information, a general description of the nature of the troubleshooting activity required (i.e., an AC Power Test), a list of the various, relevant troubleshooting activities for the given weighing device, a troubleshooting overview, and a table showing the expected outcomes of the troubleshooting activities and the appropriate responses to incorrect outcomes. Of course, this particular web page 80 is exemplary in nature, and it is to be understood that the content of any given web page may vary.

Examples of other types of web page 80 content may include operation manuals, configuration guides, training documentation, and instructional videos. One or more of the databases ($DB_1$-$DB_n$) illustrated in FIG. 4 may also comprise information organized in a manner such that QR code data may be used to filter the database information so that only information relevant to the model and configuration of weighing device that generated the QR code is presented on the user interface. This filtering, in combination with user entered information, may also be used to generate a customized information source (a knowledge base) to assist a user in the operation, configuration and/or maintenance of a weighing device.

Figure 6:
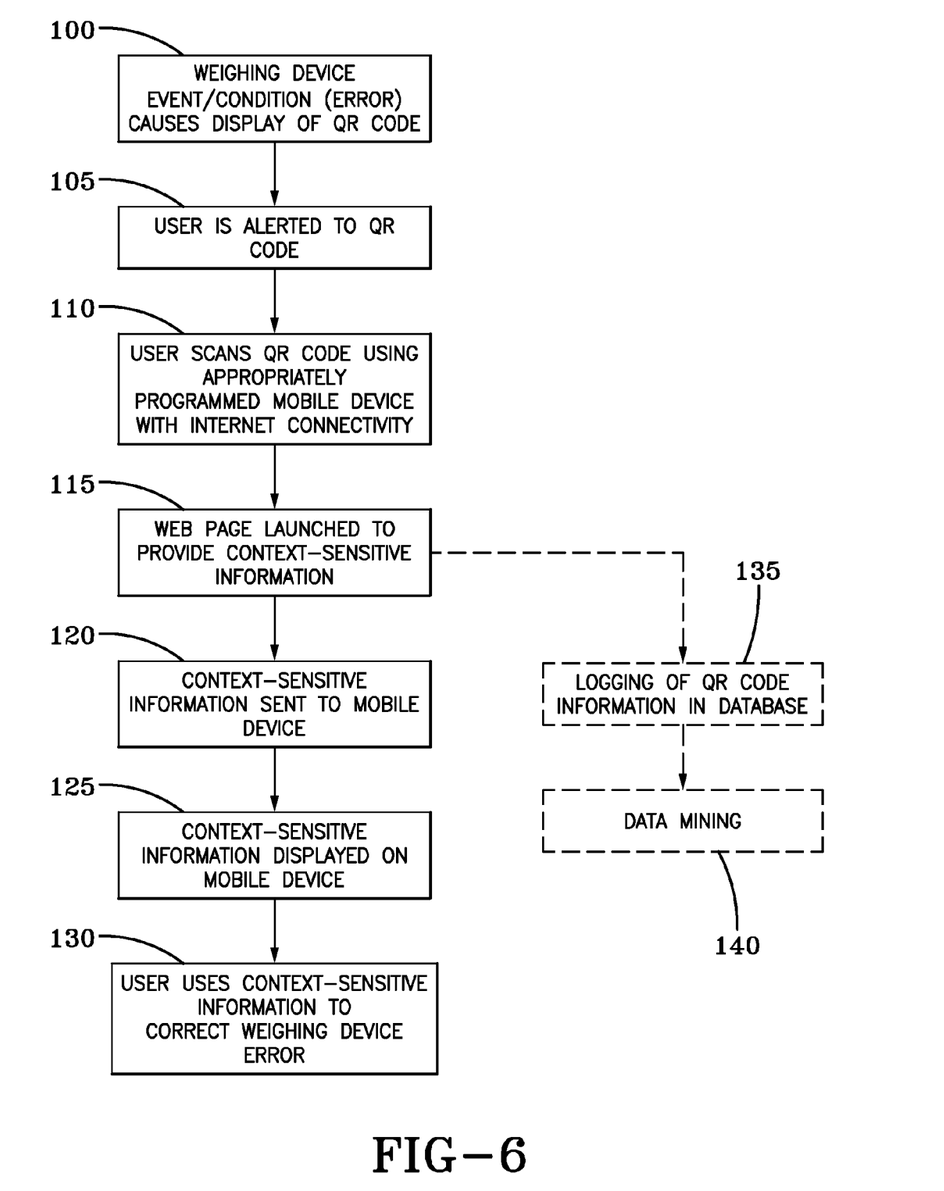
FIG. 6 is a flow chart representing one exemplary method of practicing the invention.

One stepwise method of using an exemplary embodiment of the invention for the purpose of error and/or event resolution may be further understood by reference to the block diagram of FIG. 6. As previously described, some event/condition of a weighing device of interest causes the generation of a QR code 100 according to the weighing device programming. At some point, a user is alerted to the QR code 105, such as by viewing the display thereof in response to improper or non-operation of the weighing device, as a result of an alert mechanism such as an audible and/or visual alarm, etc.

Once the user observes the presence of the displayed QR code, the user in this example proceeds to scan the QR code 110 by first using the camera of a mobile device to capture an image of the QR code. The mobile device, such as the smart phone 45 of FIGS. 3a-3b and 5a-5b, is Internet connectable and is loaded with a QR code scanning application. Subsequent to capturing the QR code image, the QR code scanning application proceeds to decode the QR code.

As a result of decoding the QR code in this embodiment, the scanning application, as directed by a hyperlink embedded in the QR code, causes the mobile device to connect to the Internet (if not already connected) and to issue a web page request that launches a web page 115 containing context-sensitive information relevant to the QR code. The requested web page is then sent 120 to and displayed 125 on the mobile device such that the user may use information contained in the web page (and/or a web page(s), document(s), video(s), etc., accessible from the web page) to correct the weighing device error 130 that caused the generation and display of the QR code.

As also illustrated in FIG. 6, the invention may also afford the sender of the context-sensitive information the opportunity to collect (log) QR code-related data 135, as described above. The collected data can be subsequently mined 140 in order to determine the frequency of error occurrence on given weighing devices, or for virtually any other desired purpose. While for the purpose of illustration, logging of such data is shown to occur at the time of launching the remote web application, data logging is not required to occur at this point in the process.

The flowchart of FIG. 6 describes one exemplary embodiment of a method of practicing the invention. It should be realized, however, that practicing the invention by way of an alternative method, such as through the use of a tablet PC, by transferring the QR code to a device other than the device used to capture the QR code image, by transferring the QR code to another device by way of a USB flash drive or other storage medium, for a purpose other than to remedy an error/condition of a weighing device, or by other suitable alternative techniques, is also possible.

In another embodiment of the invention, a QR code may be scanned and decoded by a mobile device such as a smart phone 45 but rather than displaying a web page, the smart phone may interpret the QR code and forward the information contained within the QR code to a web interface 60 with instructions to deliver the requested web page to a second computer device. The IP address of the second computer device or an email address for the user of such a device may be contained within the information sent by the smart phone 45, or may be determined based on a predefined protocol housed in the data interface 65 or a database ($DB_1$-$DB_n$) as illustrated in FIG. 4. Such a protocol may use the IP address or network interface ID of the mobile device sending the QR code information to determine the proper location to send the requested information. In such an embodiment, an operator of the second computer device may also receive a message or email with instructions (such as a hyperlink) to enable the second computer device to access the information requested by the QR code.

While certain exemplary embodiments of the present invention are described in detail above, the scope of the invention is not to be considered limited by such disclosure, and modifications are possible without departing from the spirit of the invention as evidenced by the following claims:

What is claimed is:

1. A system for providing context-sensitive information to a user in response to a weighing device event/condition or a request for operational and/or configuration information, comprising:
   a weighing device having a display and a microprocessor, and programmed to generate and display a 2-D barcode in response to the weighing device event/condition or request for operational and/or configuration information;
   a scanning device having Internet connectivity and adapted to capture a digital image of the 2-D barcode presented on the display of the weighing device, the scanning device including a microprocessor and an associated scanning application that is adapted to decode the 2-D barcode;
   a hyperlink embedded in the 2-D barcode so as to cause the scanning device to request a 2-D barcode context-sensitive web page as directed by the hyperlink upon decoding of the 2-D barcode;
   a server for receiving a web page request from the scanning device; and
   an application on the server that, in response to receiving the web page request from the scanning device, is operative to retrieve the requested web page and transmit the web page to the scanning device for display to the user.

2. The system of claim 1, wherein the weighing device is a static scale or a checkweigher.

3. The system of claim 2, wherein the static scale or checkweigher includes a remote terminal that houses the microprocessor and display.

4. The system of claim 1, wherein the 2-D barcode is selected from the group consisting of a quick response (QR) code and a Microsoft (MS) Tag.

5. The system of claim 1, wherein the scanning device is a camera-enabled smart phone or tablet PC.

6. The system of claim 1, wherein the weighing device is adapted to permit downloading of the 2-D barcode to a USB flash drive or to another portable storage medium.

7. The system of claim 1, wherein the web page that is sent to the scanning device includes troubleshooting steps directed at correcting a weighing device event/condition that produced the 2-D barcode.

8. The system of claim 1, wherein the web page that is sent to the scanning device includes a link to a different web page.

9. The system of claim 1, further comprising a data collection server adapted to receive and store data related to the 2-D barcode, data stored by the data collection server being selected from the group consisting of the IP address of the scanning device, the date/time of 2-D barcode generation, the date/time of a web page request as a result of 2-D barcode decoding, the event/condition that generated the 2-D barcode, the model number of the weighing device, the serial number of the weighing device, and the software version of the weighing device.

10. A method for providing context-sensitive information to a user in response to a weighing device event/condition or a request for operational and/or configuration information, comprising:
   providing a weighing device with a display and a microprocessor, and programming the weighing device to generate and display a 2-D barcode in response to a weighing device event/condition or a request for operational and/or configuration information;
   embedding a hyperlink in the 2-D barcode;
   using a camera-enabled scanning device having a microprocessor and Internet connectivity to capture a digital image of the 2-D barcode presented on the display of the weighing device;
   using a scanning application and the microprocessor of the scanning device to decode the 2-D barcode;
   upon decoding of the 2-D barcode, causing the scanning device to request a 2-D barcode context-sensitive web page as directed by the embedded hyperlink;
   providing a server for receiving the web page request from the scanning device; and placing an application on the server that, in response to receiving the web page request from the scanning device, retrieves the requested web page and transmits the web page to the scanning device for display to the user.

11. The method of claim 10, wherein the weighing device is a static scale or a checkweigher.

12. The method of claim 10, wherein the 2-D barcode is selected from the group consisting of a quick response (QR) code and a Microsoft (MS) Tag.

13. The method of claim 10, wherein the scanning device is a smart phone or tablet PC.

14. The method of claim 10, wherein the web page that is sent to the scanning device includes troubleshooting steps directed at correcting the weighing device event/condition that produced the 2-D barcode.

15. The method of claim 10, wherein the web page that is sent to the scanning device includes a link to a different web page.

16. The method of claim 10, further comprising collecting and storing data related to the 2-D barcode, the stored data selected from the group consisting of the IP address of the scanning device, the date/time of 2-D barcode generation, the date/time of a web page request as a result of 2-D barcode decoding, the event/condition that generated the 2-D barcode, the model number of the weighing device, the serial number of the weighing device, and the software version of the weighing device.

17. A method for providing context-sensitive information to a user for use in correcting an error code producing event/condition of a weighing device, comprising:
    providing a weighing device with a display and a microprocessor, and programming the weighing device to generate and display an error code in the form of a 2-D barcode in response to a given weighing device event/condition;
    embedding in the 2-D barcode a hyperlink to a corresponding troubleshooting web page containing information relevant to the 2-D barcode;
    using a camera-enabled smart phone having wireless Internet connectivity to capture a digital image of the 2-D barcode presented on the display of the weighing device;
    using a scanning application and a microprocessor of the smart phone to decode the 2-D barcode;
    upon decoding of the 2-D barcode, causing the smart phone to request the corresponding 2-D barcode troubleshooting web page as directed by the hyperlink;
    providing a web server for receiving the web page request from the smart phone;
    placing an application on the server that, in response to receiving the web page request from the smart phone, retrieves the requested web page and transmits the web page to the smart phone for viewing by the user;
    transmitting the requested web page to the smart phone for viewing by the user; and
    using information contained in the web page received on the smart phone to correct the weighing device/event condition that produced the 2-D barcode.

18. The method of claim 17, wherein the web page that is sent to the scanning device includes a link to a different web page.

19. The method of claim 17, further comprising collecting and storing data related to the 2-D barcode, the stored data selected from the group consisting of the IP address of the scanning device, the date/time of 2-D barcode generation, the date/time of a web page request as a result of 2-D barcode decoding, the event/condition that generated the 2-D barcode, the model number of the weighing device, the serial number of the weighing device, and the software version of the weighing device.

20. The method of claim 17, wherein the 2-D barcode is selected from the group consisting of a quick response (QR) code and a Microsoft (MS) Tag.

* * * * *